United States Patent [19]
Hynes

[11] 3,963,466
[45] June 15, 1976

[54] COMPRESSED GAS DRYING APPARATUS

[76] Inventor: William M. Hynes, 945 S. Spring Ave., La Grange, Ill. 60525

[22] Filed: Feb. 18, 1975

[21] Appl. No.: 550,624

[52] U.S. Cl. .................................. 55/269; 62/272
[51] Int. Cl.² ........................................ B01D 35/18
[58] Field of Search ............... 55/268, 269; 62/90, 62/93, 272

[56] References Cited
UNITED STATES PATENTS

| | | | |
|---|---|---|---|
| 2,214,057 | 9/1940 | Hull | 62/90 |
| 3,453,809 | 7/1969 | Henderson | 55/269 |
| 3,541,807 | 11/1970 | Henderson | 55/269 |
| 3,797,565 | 3/1974 | Fernandes | 55/269 |

Primary Examiner—Bernard Nozick
Attorney, Agent, or Firm—Wegner, Stellman, McCord, Wiles & Wood

[57] ABSTRACT

This invention relates to apparatus for drying gases, more particularly compressed air, and provides a unitary vessel divided into heat exchange, refrigeration, and demister sections by means of a series of baffles providing passages for gas flow from section to section in spaces provided between the components forming the sections and the interior walls of the container.

4 Claims, 6 Drawing Figures

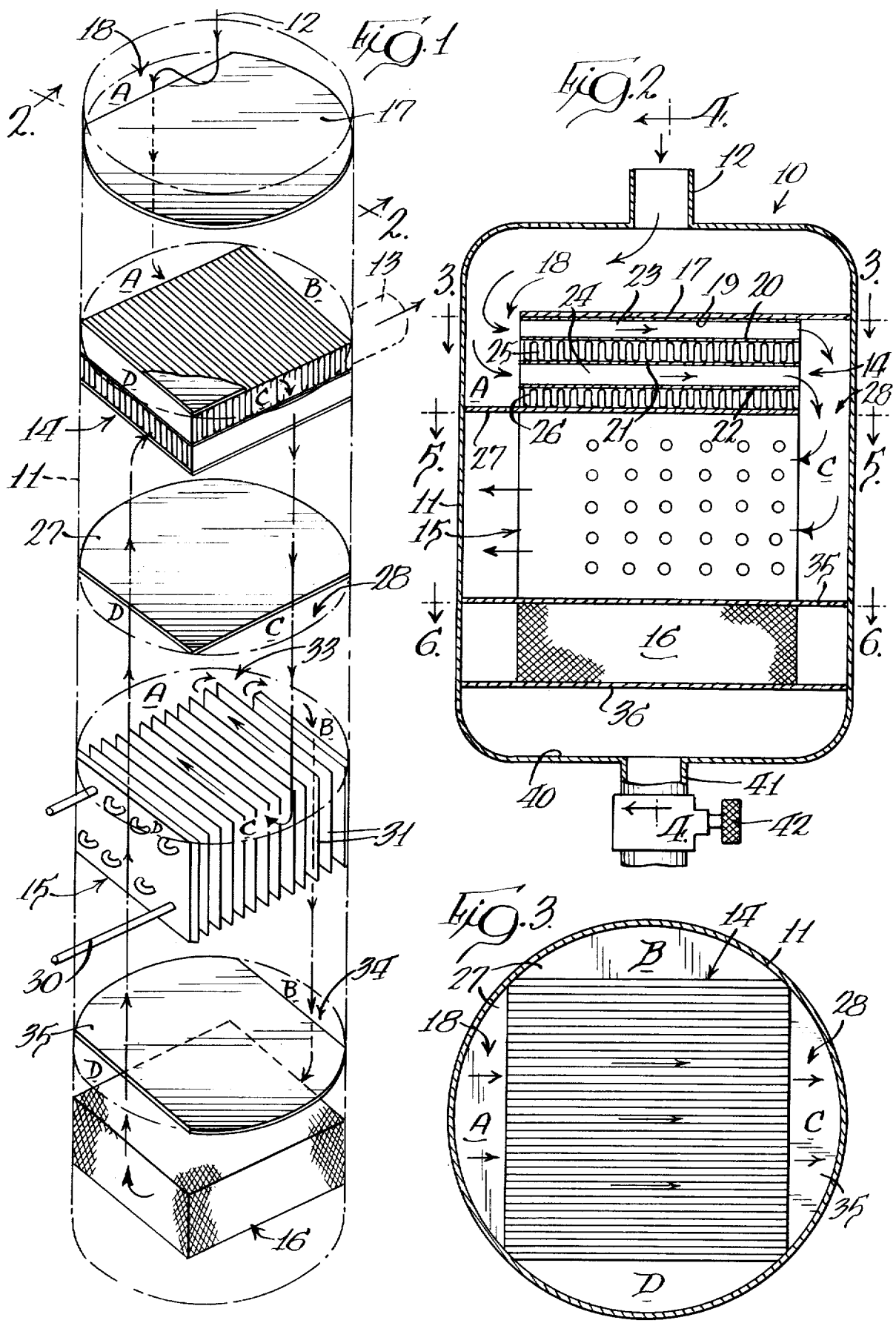

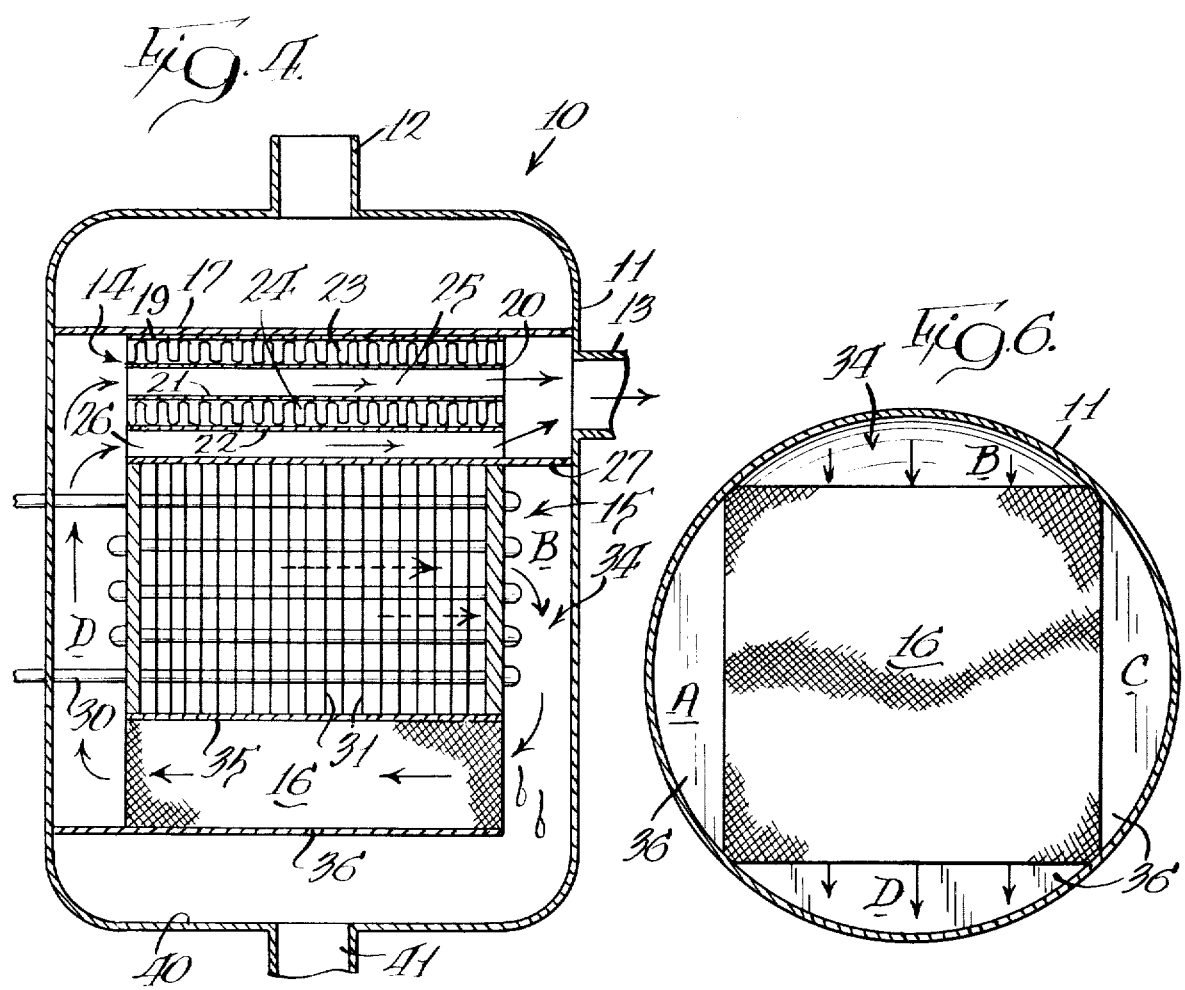
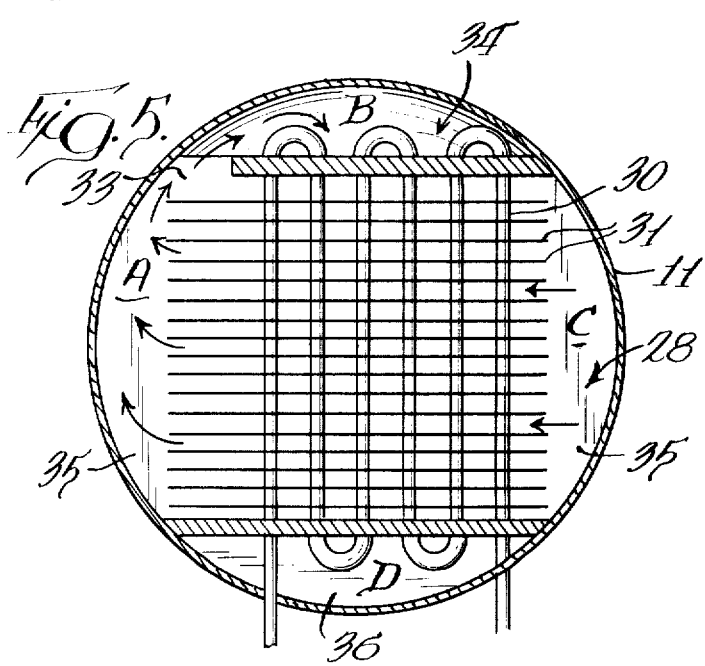

COMPRESSED GAS DRYING APPARATUS

BACKGROUND OF THE INVENTION

In many applications it is necessary to remove a liquid in vapor form from a gas. This is particularly true where the vapor is water vapor and the gas is compressed air. It has been customary to remove water vapor from compressed air by chilling the air to condense the water vapor therein and then passing the chilled air through a demister section to remove entrained particles of water. For the most part, such systems comprise a series of separate vessels forming the various chambers in which the refrigeration and demisting occurred, and such apparatus was generally designed on an individual basis for the particular installation involved.

SUMMARY OF THE INVENTION

The present invention provides an apparatus for removing liquid vapor from gas which is in the form of a unitary structure, i.e., a single vessel, enclosing not only a refrigeration section and a demister section, but also a heat exchange section whereby incoming gas is cooled and exiting (dried) gas is warmed by passage therethrough. In its preferred embodiment, the apparatus comprises a cylindrical vessel enclosing heat exchange, refrigeration, and demister sections, the sections being of polygonal shape thereby providing arcuate spaces between the edges of the sections and the inner walls of the cylinder. By means of baffles, selected ones of the spaces provide passages for the gas sequentially through the various sections of the vessel.

By means of the construction included within the present invention, it is possible to design and fabricate "standard" sizes of gas drying apparatus which are readily adaptable for use under a wide variety of circumstances and thus may be produced more economically and utilized more efficiently than heretofore possible.

BRIEF DESCRIPTION OF THE DRAWINGS

FIG. 1 is an exploded view showing the gas flow through the various sections of the vessel enclosing the same;

FIG. 2 is a vertical section through a vessel embodying the invention;

FIG. 3 is a horizontal section along line 3—3 of FIG. 2;

FIG. 4 is a vertical section along line 4—4 of FIG. 2;

FIG. 5 is a horizontal section along line 5—5 of FIG. 2; and

FIG. 6 is a horizontal section along line 6—6 of FIG. 2.

DESCRIPTION OF THE PREFERRED EMBODIMENT

While it will be readily apparent to those skilled in the art that the apparatus of the present invention may be utilized to remove many liquids in vapor form carried by a gas, the particular embodiment chosen for the purposes of illustration is designed to remove water in vapor form from compressed air in order to provide a dry air for various uses.

Referring to the drawings, there is shown a compressed air dryer 10 in the form of a cylindrical vessel 11 arranged with its axis in a generally upright or vertical position. The vessel is provided with an inlet 12 at its top and an outlet 13 from the side of the vessel adjacent the top.

Means are provided within vessel to define a heat exchange section 14, a refrigeration section 15, and a demister section 16. Each of the sections just mentioned is polygonal in shape, square as shown, to provide arcuate spaces between the edge portions of the parts making up each section and the interior wall of the vessel 11. As will be later described in further detail, some of such spaces remain open and others are closed in order to define air passages from the inlet through all of the sections sequentially to the outlet. As the parts defining each of the three sections mentioned are square in the embodiment chosen for illustration, four such arcuate spaces are provided adjacent each section and they have been indicated as A, B, C, and D in the drawings. Thus, for example, the arcuate section A extends vertically from the top to the bottom of the vessel with the section being open in some places and closed off elsewhere by baffles in a manner to be hereinafter described.

The first of such baffles is the baffle 17 forming the top cover of the heat exchange section and as shown in the drawings, closing off the arcuate spaces B, C, and D, but being open at the location of the space A, thus providing a passageway indicated as 18 from the inlet across the top of the baffle 17 to the heat exchanger section 14.

The heat exchange section 14 comprises four spaced plates 19, 20, 21 and 22. Between adjacent plates there is provided a convoluted metal member with the convolutions being so arranged so as to provide passages 23 and 24 from left to right (as seen in FIG. 2) between the plates 19 and 20, and 21 and 22, and to provide passages 25 and 26 running at 90 degrees to the first-mentioned passages between the plates 20 and 21, and the plate 22 and baffle 27 therebelow.

The refrigeration section 15 is defined by the baffle 27 positioned at its top with the baffle being arranged so as to close off all of the arcuate spaces except the space C so that compressed air flowing through the passages 23 and 24 pass downwardly through the space C and into the refrigeration section. The passage just described is indicated by the reference numeral 28. The refrigeration section includes a number of spaced metal plates 31 cooled by contact with a refrigeration coil 30 connected to a refrigerant compressor outside of the vessel (not shown). As best shown in FIG. 5, the plates 30 forming the refrigeration section are "cut off" in the upper left-hand corner as shown in that figure to provide a horizontal passage 33 for the compressed air exiting from the refrigeration section into the space A, into the arcuate space B, from which the chilled air may pass downwardly into the demister section 16. This passage is indicated by the reference numeral 34.

The demister section 16 includes a baffle 35 at its top and a second baffle 36 at its bottom, with the demister section being formed in the usual manner, upon which entrained particles of water will impinge and coalesce. The baffle 35 closes off the A and C arcuate spaces but leaves the spaces B and D open so that air flowing downwardly in space B from the refrigeration section may pass through the demister and into space D.

Below the demister section 16 is a sump generally indicated as 40 provided with a drain opening 41 controlled by a valve 42. The latter may be periodically opened to permit water which has been removed from the air to be drained from the sump.

It will be noted that water condensing on the plates 30 may drip downwardly in the arcuate space B (passage 34) into the sump and moisture captured by the demister will also drain into the sump for subsequent removal.

Chilled dry air exiting from the demister 16 and passing upwardly through the arcute space D is again passed through the heat exchange section 14 through the passages 25 and 26, and exit through the outlet 13.

In the preferred form of construction of the apparatus of this invention, the various square sections are sealed at their corners to the interior wall of the vessel 11 by an epoxy type of sealing material. The same type of sealing material may be used to seal the edges of the various baffles to the interior walls, thus providing a method of construction which is relatively simple and precise. The top portion of the vessel 10 may, of course, be initially a separate piece during the assembly of the interior components and then welded or otherwise secured in place to provide a unitary structure capable of sustaining the pressure of the compressed air.

I claim:

1. A compressed air drying apparatus comprising a cylindrical vessel arranged with its axis substantially vertical; an inlet and an outlet for the vessel; means in the vessel defining a horizontally arranged polygonal heat exchange section having a heat exchanger therein, a horizontally arranged polygonal refrigeration section positioned below the heat exchange section and having a refrigerated heat exchanger including means for introducing a refrigerant thereinto and a polygonal demister section positioned below the refrigeration section and having a demister therein, there being arcuate spaces between the edges of each of said sections and the interior wall of said vessel; baffle means including generally circular plates snugly received within said vessel and associated with each section and having at least one peripheral segment removed to open at least one of said spaces to provide an air flow passage directing air entering the inlet sequentially through the heat exchange section, the refrigeration section, the demister section, and finally again through the heat exchange section to the outlet, said final passage through the heat exchange section being in heat exchange relation to, but out of direct contact with, air making the first passage through the heat exchange section.

2. Compressed air drying apparatus according to claim 1 wherein said circular plates are separate from said heat exchangers and said demister.

3. The drying apparatus of claim 1 in which said heat exchanger includes a plate, a convoluted metal member on one side of the plate forming a plurality of passageways extending horizontally across said vessel and in communication with the inlet; a convoluted metal member on the opposite side of said plate to form a plurality of horizontal passageways extending at 90° relative to the first passageway and in communication with the outlet.

4. A compressed air drying apparatus comprising a vertically arranged cylindrical vessel having an inlet and an outlet; means in the vessel adjacent the top thereof defining a horizontally arranged square heat exchange section having a first heat exchanger therein; means in the vessel below the heat exchange section defining a horizontally arranged square refrigeration section positioned below the heat exchange section and having a second refrigerated heat exchanger including means for introducing a refrigerant thereinto; means in the vessel below the refrigeration section defining a square demister section positioned below the refrigeration section and having a demister therein, there being four arcuate spaces between each of said sections and the adjacent interior wall of the vessel; baffle means associated with each section and arranged to close off some of said arcuate spaces to provide an air flow passage directing air entering the inlet sequentially through the heat exchange section, the refrigeration section, the demister section, and then again through the heat exchange section to the outlet, said final passage through the heat exchange section being in heat exchange relation to, but out of direct contact with, air making the first passage through the heat exchange section, said baffle means including a first baffle between said inlet and said outlet for directing compressed air from said inlet to said first heat exchanger, a second baffle between said first heat exchanger and said second heat exchanger for directing compressed air from said first heat exchanger to said second heat exchanger, and a third baffle between said second heat exchanger and said demister for directing compressed air from said second heat exchanger through said demister, said second and third baffles also serving to direct air from said demister to said first heat exchangerout of direct contact with compressed air from said inlet through which it may pass to said outlet.

* * * * *